July 7, 1964     R. H. HERRON ETAL     3,139,671
METHOD FOR ATTACHING A COMPOSITION METAL-CERAMIC
MATERIAL TO A BACKING MEMBER
Filed April 16, 1962                         2 Sheets-Sheet 1
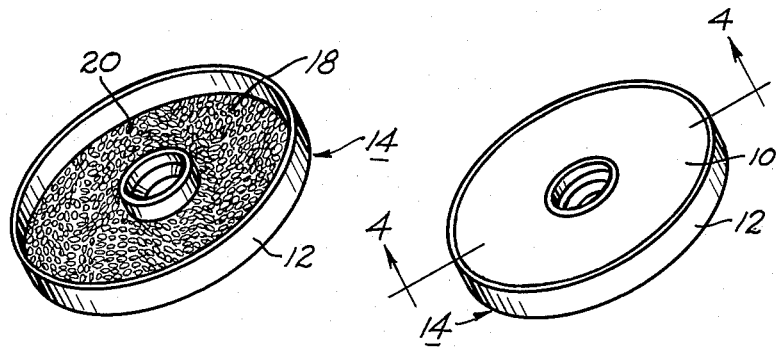
FIG_2        FIG_1
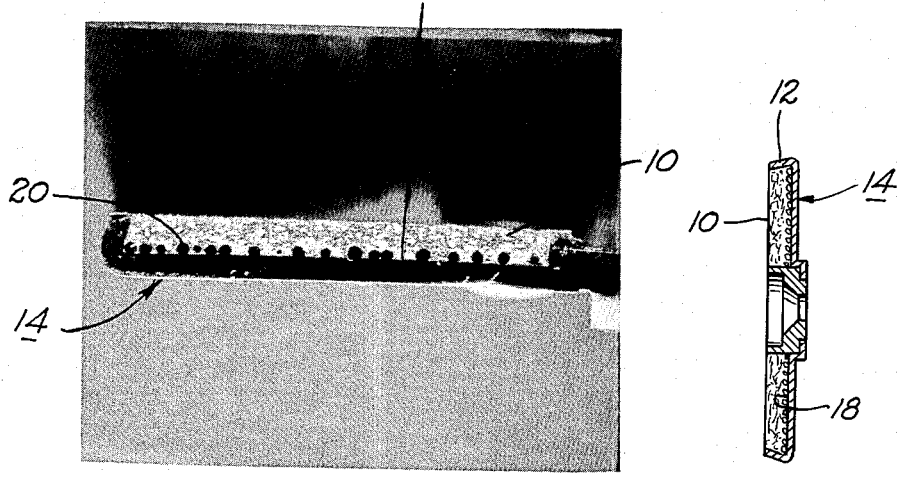
FIG_3        FIG_4
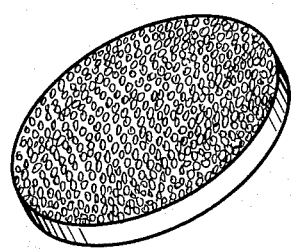
FIG_5
INVENTORS
**ROBERT H. HERRON.
NORMAN E. JANNASCH.**
BY
*William P. Hickey*
ATTORNEY July 7, 1964 R. H. HERRON ETAL 3,139,671
METHOD FOR ATTACHING A COMPOSITION METAL-CERAMIC
MATERIAL TO A BACKING MEMBER
Filed April 16, 1962 2 Sheets-Sheet 2
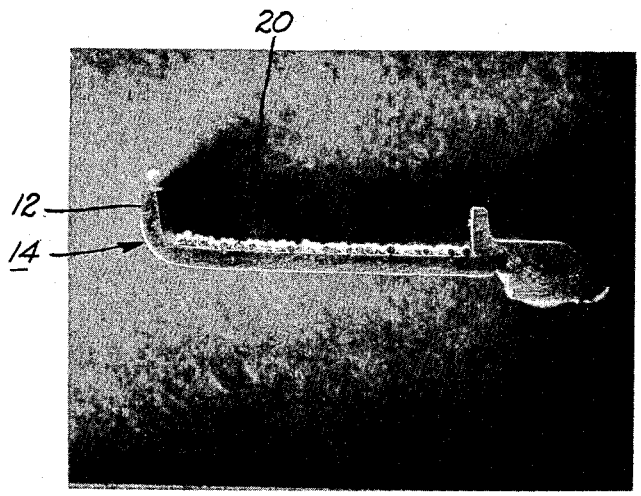
FIG_6
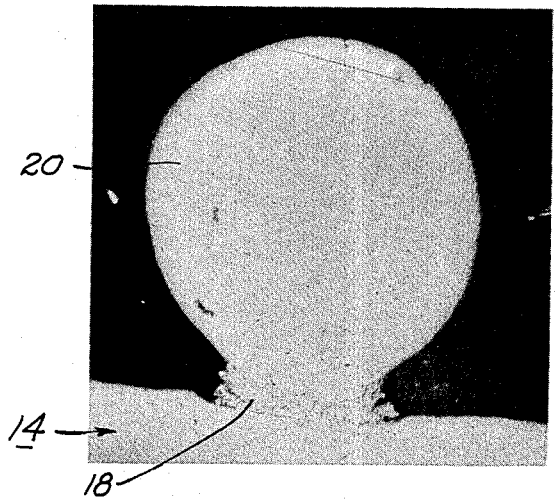
FIG_7
INVENTORS
ROBERT H. HERRON.
NORMAN E. JANNASCH.
BY
ATTORNEY.

United States Patent Office 3,139,671
Patented July 7, 1964

3,139,671
METHOD FOR ATTACHING A COMPOSITION METAL-CERAMIC MATERIAL TO A BACKING MEMBER
Robert H. Herron and Norman E. Jannasch, South Bend, Ind., assignors to The Bendix Corporation, South Bend, Ind., a corporation of Delaware
Filed Apr. 16, 1962, Ser. No. 187,907
7 Claims. (Cl. 29—182.3)

This invention is directed to a method for attaching a composition metal-ceramic material to a backing member. The present application is a continuation in-part of our copending application, Serial No. 723,252, filed March 24, 1958.

Metal-ceramic friction compositions have become extremely valuable in the field of aircraft braking. The worth of these friction compositions has been extensively demonstrated on many aircraft installations, military and civilian alike. This advance in the art has not come, however, without some attendant problems, the chief of which lies in devising an efficient reliable process for affixing the metal-ceramic composition onto a suitable backing member.

The most successful of the prior art methods, of which we are aware, is that shown in U.S. application No. 600,-808, filed July 30, 1956, in which a perforated screen or disk is welded to the base of a mounting cup and the friction composition is then pressed into the screen (or disk). The perforated screen serves as a means of attachment between the friction composition and the base of the mounting cup. While this arrangement has been used in many thousands of friction articles with considerable success, it has long been the ambition of those skilled in the art to simplify and improve the described mounting structure because it is an item of considerable expense, since it necessitates welding at the base of the cup, and it fails to provide a sufficient grip for the friction composition under some circumstances.

Another way of attaching a metal-ceramic friction composition to a backing is to flash coat a thin layer of copper over an iron or iron alloy backing and then, during sintering of the friction composition, exert sufficient pressure against the face of the friction composition so that there occurs a bond of the friction composition with the flash coating. This is sometimes referred to as a "pressure-sintering" technique.

An object of the present invention is to provide a novel bonding which incorporates the principles of both of the described types of fastening and which is at the same time both more economical and eliminates the perforated disk element. We achieve in this invention all of the advantages of a mechanical bond, and, we depend in part upon a metallurgical type bond (achieved with the pressure-sintering technique), but we do not require external pressure which is a cumbersome requirement in the "pressure-sintering" process.

Many substantial benefits accrue from the invention and among those which are more important are the following:

(1) The bonding between friction material and backing makes it possible to completely wear the friction material without producing failure of the bonding.
(2) Cracking of the friction composition is minimized. It has been observed that a friction composition, which is not adequately bonded across the entire base thereof, will have a tendency to craze and spall unduly to disrupt the continuity of the friction surface. By firmly securing the under surface of the friction composition through an intermediary, it is intended to minimize this breaking out of portions of the friction composition at the working surface.

(3) By improving the strength of the bond at the undersurface of the friction composition, it will be possible to eliminate the requirement for cupped sides which implement the fastening. This will depend also, of course, upon the internal strength of the friction composition, that is, its ability to withstand stresses imposed during use without crumbling.
(4) It is possible to achieve a metallurgical bonding between the metal-ceramic material and the intermediary without exerting pressure on the face of the friction composition during the sintering operation. This forms an important advantage over the previously described "pressure-sintering" process.

In addition to these foregoing advantages, there is an important advantage to the invention in that the steps are inherently economical to follow and calculated to develop a uniform product which will function in the manner intended.

Other objects and features of the present invention will become more apparent from a consideration of the following descriptions, which proceeds with reference to the accompanying drawings.

These selected embodiments of the invention are merely illustrative of the principles of the invention and are in no way to be construed as restrictive thereof. In the drawings:

FIGURE 1 is an isometric view of one of the articles which is made in accordance with the present invention;

FIGURE 2 shows a supporting structure for a metal-ceramic composition with the bonding intermediary affixed thereto and prior to adding the friction composition;

FIGURE 3 is a photomicrograph taken at a magnification of 4 diameters and showing a cross section of the finished article;

FIGURE 4 is a section view taken on line 4—4 of FIGURE 1;

FIGURE 5 is a second backing member prior to adding the friction composition, the backing member being without the supporting edges shown in FIGURE 2;

FIGURE 6 is a photograph similar to that of FIGURE 3 but showing a section of a pelletized cup which is ready to have the friction material pressed therein; and FIGURE 7 is a photomicrograph of a section through a single pellet brazed to its backing member and at a magnification of 100 diameters.

Referring to FIGURE 1, there is shown a metal-ceramic composition which is usable in a brake or clutch mechanism. The contents of the metal-ceramic composition are set forth at some length in U.S. Patent No. 2,784,105, and related composition are described in the U.S. application No. 602,480, filed July 20, 1956, and now abandoned, and U.S. application No. 688,917, filed October 8, 1957, now Patent No. 2,948,955. The contents of the metal-ceramic friction layer form no part of the present invention.

Referring to FIGURES 1, 3 and 4, the layer 10 consists of sintered metallic material, and dispersed therethrough is a ceramic phase which figures predominately in determining the friction characteristics of the composition. Circumscribing the metal-ceramic friction composition is a retaining lip 12 of a cup-shaped member 14. At the base of the cup, which is typically a steel member, there is a flash coating of copper which forms a layer 18. A number of very small globular pellets indicated generally by reference numeral 20 are fused to the copper layer 18. These pellets may be of any suitable tough high melting point material such as copper, steel, nickel etc. and may have an outer shell of tin or other suitable metal which promotes the brazing between the pellets and the layer 18.

Referring to FIGURE 3, the metal-ceramic material is compacted into the cup, and during compacting the metal-ceramic material flows around the spherical pellets and is lodged between the pellets 20 and the base of the cup-shaped member 14. When the article is then sintered, the metal portion of the layer 10 coalesces to form a continuous phase serving as a binder for layer 10.

Concurrently with the described sintering a certain amount of brazing takes place between the pellets 20 and the binder medium of layer 10. There is thus formed both a mechanical and a metallurgical bond between the metal-ceramic layer 10 and the cup-shaped structure 14.

As shown in FIGURE 3, the metal-ceramic material works its way toward the base of the retaining cup 14 and is thus squeezed into the pockets between adjacent pellets, thus forming a mortising or dovetailing connection.

As a working example of the invention, there was prepared a friction composition of the following relative proportions by weight:

| | |
|---|---|
| Copper | 60.0 |
| Molybdenum | 5.0 |
| Graphite | 10.0 |
| Silica | 5.0 |
| Mullite | 20.0 |

The particle sizes of the metallic binder ingredients was from approximately 100 mesh size to less than 325 mesh size. The mounting structure consisted of a steel cup-shaped article SAE 1050. The base and sides of the cup are flash coated with electrolytically deposited copper which forms a layer 18 of approximately .0003 inch. Tin-coated pellets —20 to 40 mesh size are then fused to the cup by first applying the copper-coated surface of the cup with an organic vehicle which causes the pellets to stick to the surface thereof in substantially a single layer. This organic material should be removed by heat during the brazing of the pellets 20 to the copper surface 18 without reducing the efficiency of the brazed connection.

*Example I*

The pellets are applied to the cup by sprinkling them into the organic vehicle coated cup and an excess of pellets are applied to ensure a uniform distribution throughout. The cup is then inverted to pour out the excess pellets leaving a single layer of generally spaced apart pellets and the cup is then passed through a brazing furnace and heated for 20 minutes at 1600° F. temperature in a reducing atmosphere to fuse the pellets 20 with the copper layer 18.

The metal-ceramic material as described above is then added to the backing member and the loose powder layer is compacted at about 40,000 p.s.i. The article is then transferred into a furnace with a reducing atmosphere and heated at approximately 1800° F. for thirty minutes to sinter the metallic phase of the composition which coalesces into a continuous phase binder. This is follower by coining at 100,000 p.s.i. The binder material adjoining the pellets forms a metallurgical bond with the pellets. The friction material which has been forced between the pellets serves as a mechanical interlock.

The character of this bonding is superior to the "perforated disk" process for several reasons, for example, instead of the projection welding between the disk and the base of the cup, each of the pellets is "welded" and the pellets as a whole are thus fixed more firmly to the base than the disk with its four or five projection welds. In contrast with the screen openings which are for the most part friction fits, the pellets are fused with the metallic binder portion of the layer and form, additionally, a mortised connection therewith which resembles a dovetailing.

The described structure is superior to the "pressure-sintering" of the binder to the copper layer since no external pressure is necessary to achieve the described bonding. Also, greater bonding area is provided between the cup and the binder since the pellets have spherical external area which, cumulatively, far exceeds the surface area at the base of the cup. This increase in area provides a greater attachment surface than does the perforated disk where the total cross section of the apertures determines the bonding between the cup and lining. The perforation cannot be in excess of the total disk area and the perforations must not be in such quantity as to weaken the disk. The pellets, however, can provide whatever binding surface is required without weakening the support structure.

The pellet size is governed by two considerations, (1) it must not be too large so it will become exposed at the friction surface to interfere with the effectiveness of the friction article while there is still an appreciable quantity of friction material remaining; (2) the pellets must not be of such a small size that the particles of friction composition layer are prevented from lodging between the pellets and the adjoining surface of the cup. The preferred limits of the pellet size are established by qualitative considerations which become a matter of design preference.

For most applications, the pellet size is no greater than 20 mesh because the higher mesh sizes of the binder metal are readily forcible through the interstices of pellets this size. Obviously, if the mesh size of the binder metal is made larger, this would necessitate greater sizes of the pellets. However, the mesh size of binder metals does not generally exceed 100 mesh size and so the pellets are suitable when no larger than 20 size. Any increase of pellet size does not improve the bond but does interfere with the usable quantity of friction material.

At the lower limit of pellet size, the governing consideration is the ability of the binder to penetrate the interstices, this being a function of the mesh size of the binder. The most suitable pellet sizes are generally no less than 40 mesh. When the pellets become exceedingly small, the grip between the pellets and the adjoining binder material is reduced in efficiency because the interstitial pellet area becomes very small and the binder does not readily penetrate the voids between the pellets. Pellets of a size less than 40 to 60 mesh are, therefore, not regarded suitable since increase of usable thickness of lining is more than offset by the lower bonding efficiency. The optimum mesh size for the pellets is from about —30 to about 40 mesh.

It will be obvious that pellet compositions will change with change in composition of the binder material. Thus, copper, tin-coated pellets are suitable for copper base friction compositions, but iron pellets are preferred with iron base compositions.

The composition of the pellets is determined from the fusibility thereof with the base material and whether it can become bonded at the outer surface thereof with the binder under the appropriate conditions, preferably during sintering of the binder.

While the bonding between pellets and the binder portion of the lining is desirable, it is by no means essential. We have obtained improved mounting arrangements in which the binder is mechanically locked by the pellets as described, but without any of the metallurgical attachments. Such arrangements have been tested, and while less efficient they are still suitable.

A specific example of such an arrangement is as follows:

*Example II*

(1) Friction composition same as Example I.
(2) Pellets SAE steel shot —20 to 40 mesh.
(3) Brazed to steel backing with conventional copper brazing paste at 2050° F. for five minutes.

For very high temperature applications which are beyond the limitations of the copper-tin pellets, we recommend a copper pellet which can be brazed to the backing member by either of the following example procedures:

Example III (1) Friction composition same as Example I.
(2) Pellets −20 to 40 mesh, pure copper composition.
(3) Brazed to steel backing with A.M.S. 4777 brazing paste at 1950° F. for five minutes.

Example IV (1) Same composition as Example I.
(2) Pellet size same as Example II.
(3) Brazed to steel backing with A.S.T.M. B–73–29–(1), brazing foil at 1650° F. for five minutes in reducing atmosphere.

In Examples II to IV, the steps of compacting, sintering and coining of the friction composition are substantially as described for Example I.

FIGURE 3 of the drawings shows a section of a finished article constructed according to the teachings of Example II. FIGURE 3 shows a single layer of steel shot brazed to the backing member in a manner providing the characteristic dovetailed shaped pockets between the pellets and backing member. FIGURE 6 is a section similar to FIGURE 3 showing the steel pellets brazed to the cup but prior to filling with the friction composition.

FIGURE 7 is an enlarged photograph of a section through a steel cup which has had steel pellets brazed thereto in accordance with the teachings of Example II but showing only one pellet at a magnification of 100 diameters. FIGURES 6 and 7 clearly show the dovetail shaped pockets that are formed between the pellets and the surface of the cup 14.

While the invention has been described in conjunction with a few selected examples, these are but illustrative of the invention and are in no way restrictive thereof. Numerous adaptations and revisions of the invention will undoubtedly suggest themselves to those skilled in the art and it is intended to include those adaptations and revisions as incorporate the herein disclosed principles within the scope of the following claims.

We claim:

1. A composite article comprising: a rigid metallic backing member; a substantially single layer of spaced apart generally uniform spherical metallic bodies adjacent the surface of said backing member positioned in such manner that the bodies for the most part do not contact each other, said bodies being of a size greater than approximately 60 mesh; metal solidified from a molten state bonding said spheres to said surface of said backing member, said solidified metal forming a bridge whose cross section is substantially less than the diameter of said spheres so that the areas bounded by said surface of said backing member, bridge, and adjacent surface of said spheres form acute angles; and a layer of powdered material keyed and sintered into said bounded areas forming said acute angles beneath said spherical bodies.

2. A composite article comprising: a rigid ferrous backing member; a single layer of spaced apart generally uniform spherical steel bodies adjacent the surface of said backing member positioned in such manner that the bodies for the most part do not contact each other, said bodies being of a size greater than approximately 60 mesh; a copper braze solidified from a molten state bonding said spheres to said surface of said backing member, said solidified metal forming a bridge whose cross section is substantially less than the diameter of said spheres so that the areas bounded by said surface of said backing member, bridge, and adjacent surface of said spheres form acute angles; and a layer of powdered material keyed and sintered into said bounded areas forming said acute angles beneath said spherical bodies.

3. A composite article comprising: a rigid ferrous backing member; a single layer of spaced apart generally uniform spherical copper bodies adjacent the surface of said backing member positioned in such manner that the bodies for the most part do not contact each other, said bodies being of a size greater than approximately 60 mesh; a metal solidified from a molten state bonding said spheres to said surface of said backing member, said solidified metal forming a bridge whose cross section is substantially less than the diameter of said spheres so that the areas bounded by said surface of said backing member, bridge, and adjacent surface of said spheres form acute angles; and a layer of powdered material mortised and sintered into said bounded areas forming said acute angles beneath said spherical bodies.

4. A composite article comprising: a rigid metallic backing member; a single layer of spaced apart spherical bodies adjacent the surface of said backing member positioned in such manner that the bodies for the most part do not contact each other, said bodies being of a size greater than approximately 60 mesh, each of said spherical bodies being made of a core of high melting point material and having a solidified layer of a lower melting point metal surrounding said core and forming a bridge between said core and said surface of said backing member to bond said bodies to said backing member, said bridges having a cross section substantially less than the major diameter of said spheres so that the areas bounded by said surface of said backing member, bridge and adjacent surface of said spheres form acute angles; and a layer of powdered material keyed and sintered into said bounded areas forming said acute angles beneath said spherical bodies.

5. A composite article comprising: a rigid metallic backing member; a single layer of spherical bodies adjacent the surface of said backing member positioned in such manner that the bodies for the most part do not contact each other, said layer of spaced apart spherical bodies being of generally uniform diameter and being of a size greater than approximately 60 mesh, each of said spherical bodies being made of a core of a copper base material and having a solidified layer of a lower melting point metal surrounding said core and forming a bridge between said core and said surface of said backing member to bond said bodies to said backing member, said bridges having a cross section substantially less than the major diameter of said spheres so that the areas bounded by said surface of said backing member, bridge and adjacent surface of said spheres form acute angles; and a layer of powdered material including a matrix forming material having a particle size less than approximately 100 mesh keyed and sintered into said bounded areas forming said acute angles beneath said spherical bodies.

6. A composite article comprising: a rigid metallic backing member; a single layer of spaced apart spherical metallic bodies adjacent the surface of said backing member positioned in such manner that the bodies for the most part do not contact each other, said spaced apart spherical bodies being of a size greater than approximately 40 mesh and less than approximately 20 mesh, each of said spherical bodies being made of a core of copper material and having a solidified layer of tin surrounding said core and forming a bridge between said core and said surface of said backing member to bond said bodies to said backing member, said bridges having a cross section substantially less than the diameter of said spheres so that the areas bounded by said surface of said backing member, bridge and adjacent surface of said spheres form acute angles; and a layer of powdered material including a matrix forming material having a particle size less than approximately 100 mesh keyed and sintered into said bounded areas forming said acute angles beneath said spherical bodies.

7. A composite article comprising: a rigid metallic backing member; a single layer of spaced apart generally uniform spherical steel bodies adjacent the surface of said backing member positioned in such manner that the bodies for the most part do not contact each other, said spaced apart spherical steel bodies being not smaller than approximately 40 mesh nor larger than approximately 20 mesh; a copper braze solidified from a molten state bonding said spheres to said backing member, said solidified metal forming a bridge whose cross section is substantially less than the diameter of said spheres so that the areas bounded by said flash coating, bridge, and adjacent surface of said spheres form acute angles; and a layer of powdered material keyed and sintered into said bounded areas forming said acute angles beneath said spherical bodies.

References Cited in the file of this patent

UNITED STATES PATENTS

| | | |
|---|---|---|
| 2,017,002 | Hodgson | Oct. 8, 1935 |
| 2,251,410 | Koehring et al. | Aug. 5, 1941 |
| 2,683,671 | Findlay et al. | July 13, 1954 |
| 2,888,742 | Stumback | June 2, 1959 |

FOREIGN PATENTS

| | | |
|---|---|---|
| 544,903 | Great Britain | May 1, 1942 |
| 1,010,978 | France | June 17, 1952 |